United States Patent
Uliel et al.

(10) Patent No.: US 10,282,223 B2
(45) Date of Patent: May 7, 2019

(54) METHODS AND SYSTEMS TO ASSESS EFFICIENT USAGE OF DATA-CENTER RESOURCES BY VIRTUAL MACHINES

(71) Applicant: VMware, Inc., Palo Alto, CA (US)

(72) Inventors: Yochai Uliel, Herzliya (IL); Uri Kochavi, Herzliya (IL); Aviv Rosenfeld, Palo, CA (US)

(73) Assignee: VMware, Inc., Palo Alto, CA (US)

( * ) Notice: Subject to any disclaimer, the term of this patent is extended or adjusted under 35 U.S.C. 154(b) by 12 days.

(21) Appl. No.: 14/721,654

(22) Filed: May 26, 2015

(65) Prior Publication Data

US 2016/0350143 A1 Dec. 1, 2016

(51) Int. Cl.
*G06F 9/50* (2006.01)
*G06F 9/455* (2018.01)

(52) U.S. Cl.
CPC ........ *G06F 9/45558* (2013.01); *G06F 9/5011* (2013.01); *G06F 2009/45575* (2013.01)

(58) Field of Classification Search
None
See application file for complete search history.

(56) References Cited

U.S. PATENT DOCUMENTS

| | | | | |
|---|---|---|---|---|
| 7,197,433 B2* | 3/2007 | Patel | ....................... | G06F 9/505 702/188 |
| 8,560,671 B1* | 10/2013 | Yahalom | ............. | H04L 67/1097 709/224 |
| 9,336,030 B1* | 5/2016 | Marr | .................... | G06F 9/45533 |
| 2009/0231152 A1* | 9/2009 | Tung | ....................... | G06F 1/206 340/660 |
| 2011/0296024 A1* | 12/2011 | Madani | ................. | G06F 9/5061 709/226 |
| 2013/0042234 A1* | 2/2013 | DeLuca | .............. | G06F 9/45558 718/1 |
| 2013/0304903 A1* | 11/2013 | Mick | ................... | H04L 43/0817 709/224 |
| 2015/0095906 A1* | 4/2015 | Chen | ..................... | G06F 9/5011 718/1 |
| 2015/0355923 A1* | 12/2015 | Keller | ................. | G06F 9/45558 718/1 |
| 2016/0080482 A1* | 3/2016 | Gilbert | ................ | H04L 43/0882 709/226 |

OTHER PUBLICATIONS www.acountingtools.com, Accounting Tools, Definition Gross Margin, Mar. 31, 2014, pp. 1-3.*

* cited by examiner

*Primary Examiner* — Lewis A Bullock, Jr.
*Assistant Examiner* — Bruce S Ashley

(57) ABSTRACT

Methods and systems that compute an efficiency coefficient of a set of virtual machines ("VMs") running in a cloud-computing facility are described. The set of VMs may be a collection of VMs that form a VDC or the set of VMs may be a subset of a larger set of VMs that comprises a VDC. The efficiency coefficient is a metric that may be used to evaluate effective use of cloud-computing facility resources by the set of VMs. The efficiency coefficient is calculated based on ideal and actual cumulative cost of the set of VMs utilization of cloud-computing facility resources. As a result, the efficiency coefficient may also be used to assess cost effective use of cloud-computing facility resources by the set of VMs.

24 Claims, 19 Drawing Sheets

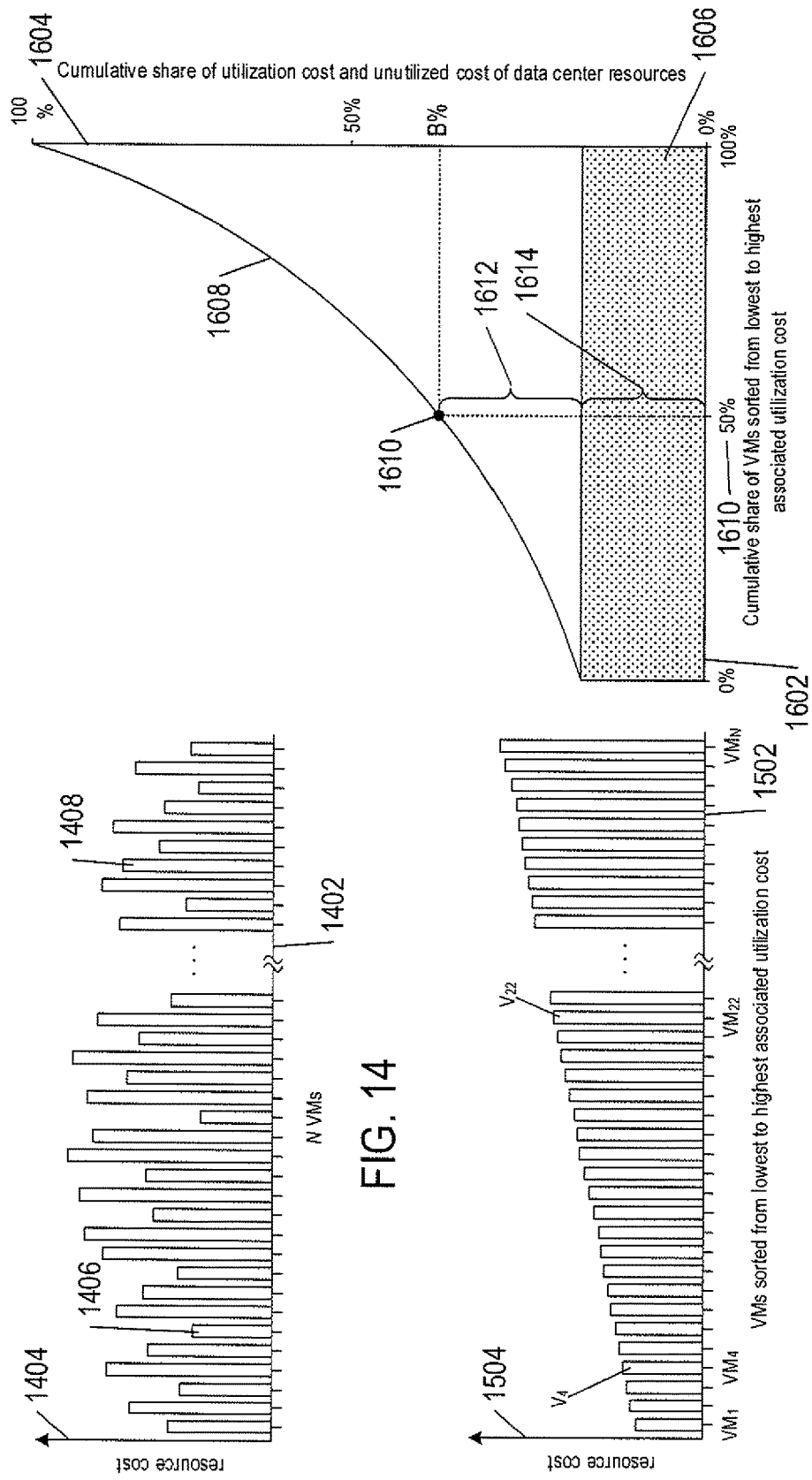

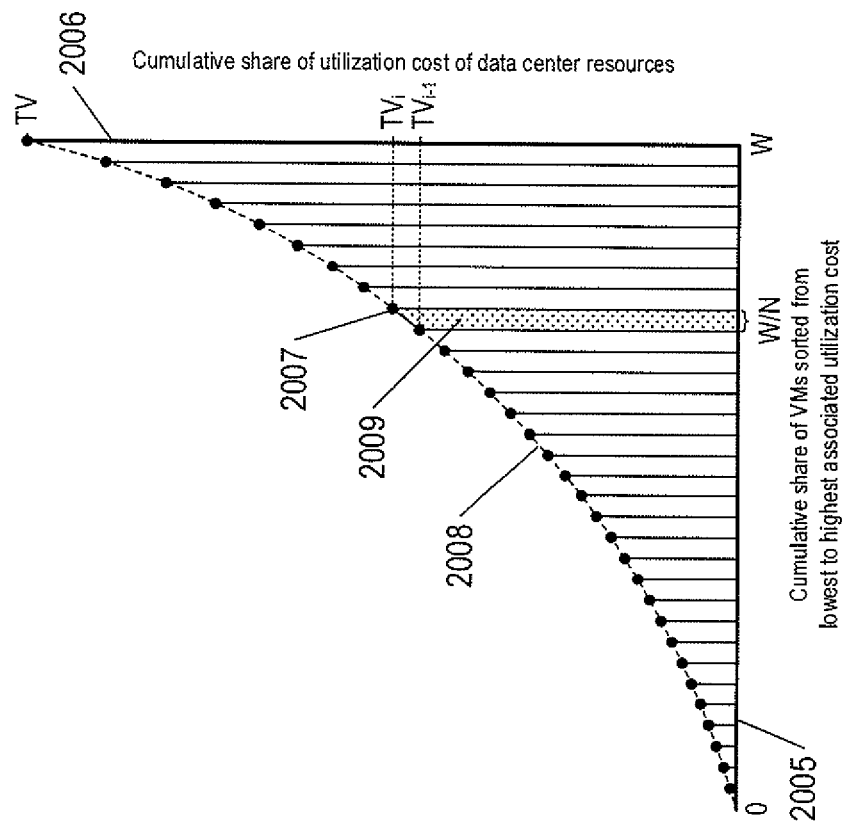
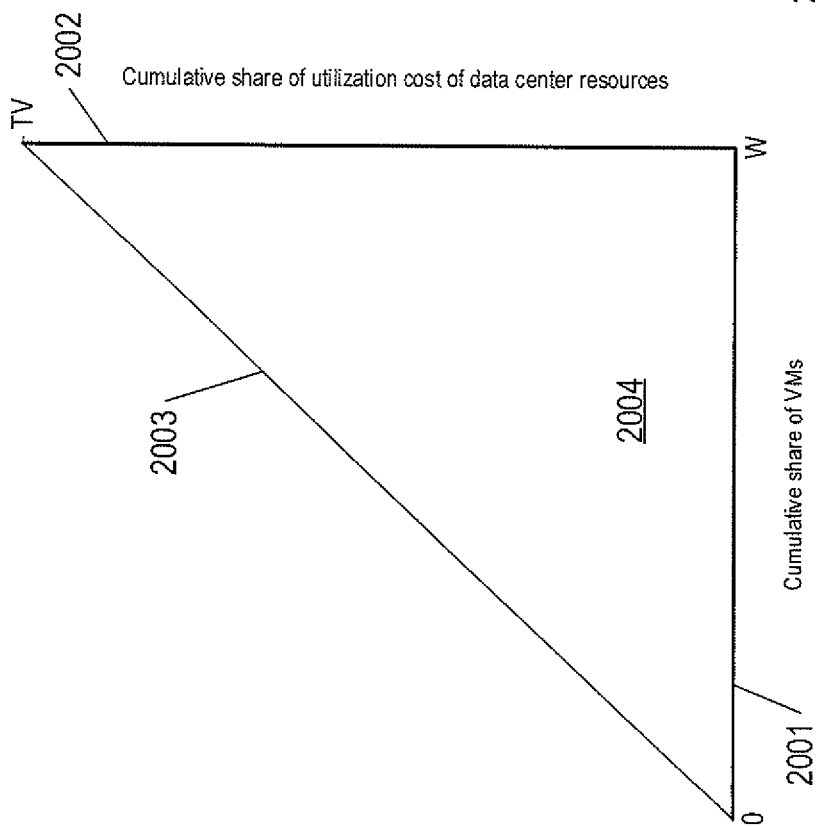
FIG. 20B
FIG. 20A

METHODS AND SYSTEMS TO ASSESS EFFICIENT USAGE OF DATA-CENTER RESOURCES BY VIRTUAL MACHINES

TECHNICAL FIELD

The present disclosure is directed to assessing efficiency of virtual machine usage of resources provided by cloud computing facilities.

BACKGROUND

In recent years, enterprises have shifted much of their computing needs from enterprise owned and operated computer systems to cloud computing providers. Cloud computing providers charge enterprises to store and run their applications in a cloud-computing facility and allow enterprises to purchase other computing services in much the same way utility customers purchase a service from a public utility. A typical cloud-computing facility is composed of numerous racks of servers, switches, routers, and mass data-storage devices interconnected by local-area networks, wide-area networks, and wireless communications that may be consolidated into a single data center or distributed geographically over a number of data centers. Enterprises typically run their applications in a cloud-computing facility as virtual machines ("VMs") that are consolidated into a virtual data center ("VDC") also called a software defined data center ("SDDC"). A VDC recreates the architecture and functionality of a physical data center for running an enterprise's applications. Because the vast numbers of VDCs and dynamic nature of VDCs running in a typical cloud-computing facility, VDC's introduce management challenges to information technology ("IT") managers. In particular, the dynamic nature of VDC's and the constant change in VM workloads presents challenges in assessing VDC financial and computational efficiency. These challenges present additional difficulties with respect to planning efficient VDC usage of cloud computing resources. Enterprises and cloud computing managers seek methods and systems to assess efficient usage of cloud-computing facility resources and report VDC financial efficiency.

SUMMARY

Methods and systems compute an efficiency coefficient of a set of VMs running in a cloud-computing facility. The set of VMs may be a collection of VMs that form a VDC or the set of VMs may be a subset of a larger set of VMs that comprises a VDC. The efficiency coefficient is a metric that may be used to evaluate effective use of cloud-computing facility resources by the set of VMs. The efficiency coefficient is calculated based on ideal and actual cumulative cost of the set of VMs utilization of cloud-computing facility resources. As a result, the efficiency coefficient may also be used to assess cost effective use of cloud-computing facility resources by the set of VMs.

DESCRIPTION OF THE DRAWINGS

FIG. 14 shows a plot of an example distribution of actual utilization cost of a set of virtual machines.
FIG. 15 shows a plot of an example distribution of an actual utilization cost of a sorted set of virtual machines.
FIG. 16 shows a plot of an example actual cumulative cost distribution of a set of virtual machines.
FIG. 20A shows a generalized plot of an ideal cumulative distribution of utilization cost associated with the set of virtual machines.
FIG. 20B shows a generalized plot of an example actual cumulative distribution of utilization cost of a sorted set of virtual machines.

DETAILED DESCRIPTION

Figure 1:
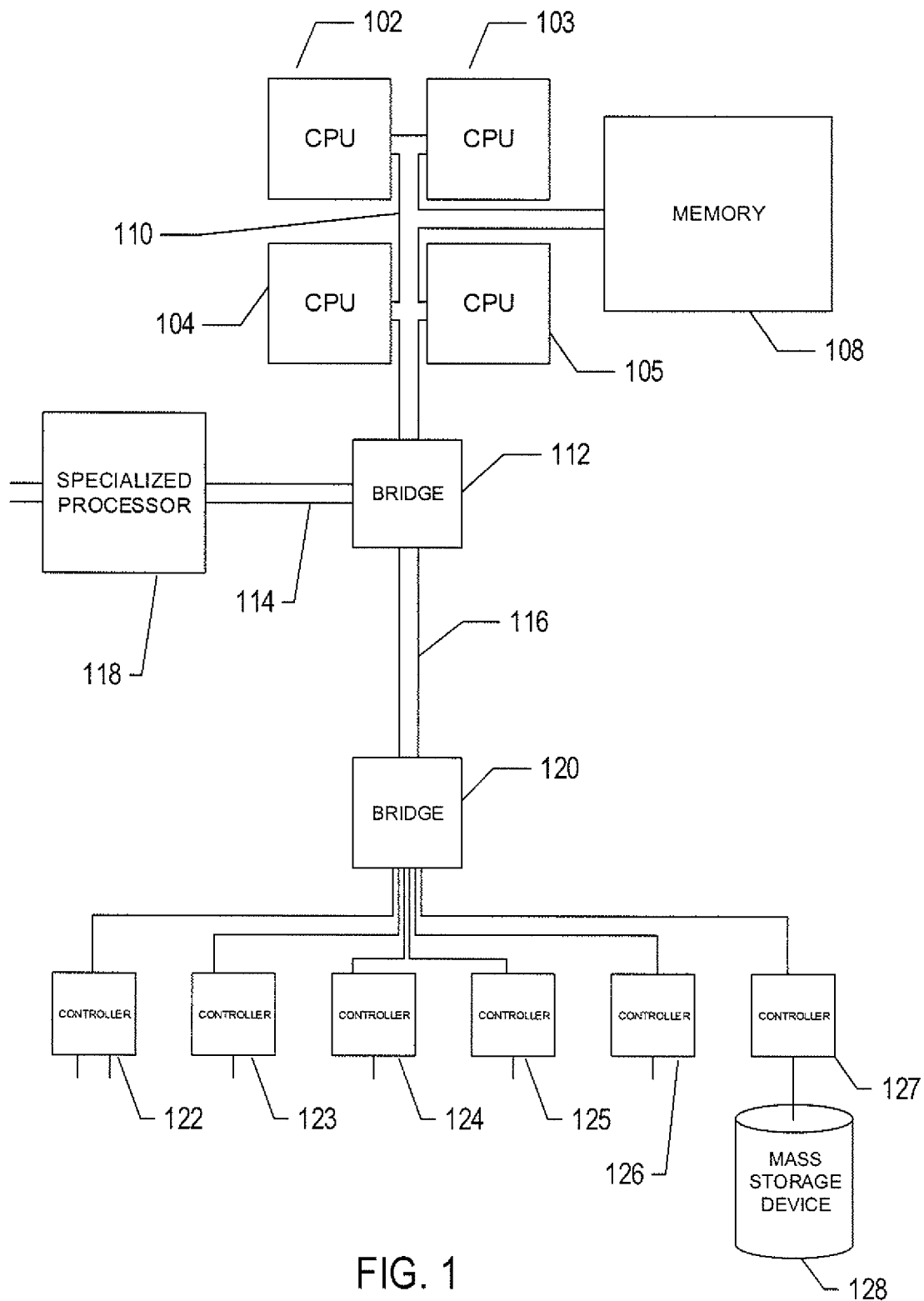
FIG. 1 shows a general architectural diagram for various types of computers.

This disclosure presents computational methods and systems to compute an efficiency coefficient for a set of virtual machines ("VMs"). A general description of physical data centers, hardware, virtualization, VMs, and virtual data centers are provided in a first subsection. Computational methods and system that compute an efficiency coefficient for a set of VMs running in a physical data center are provided in a second subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and VMs, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
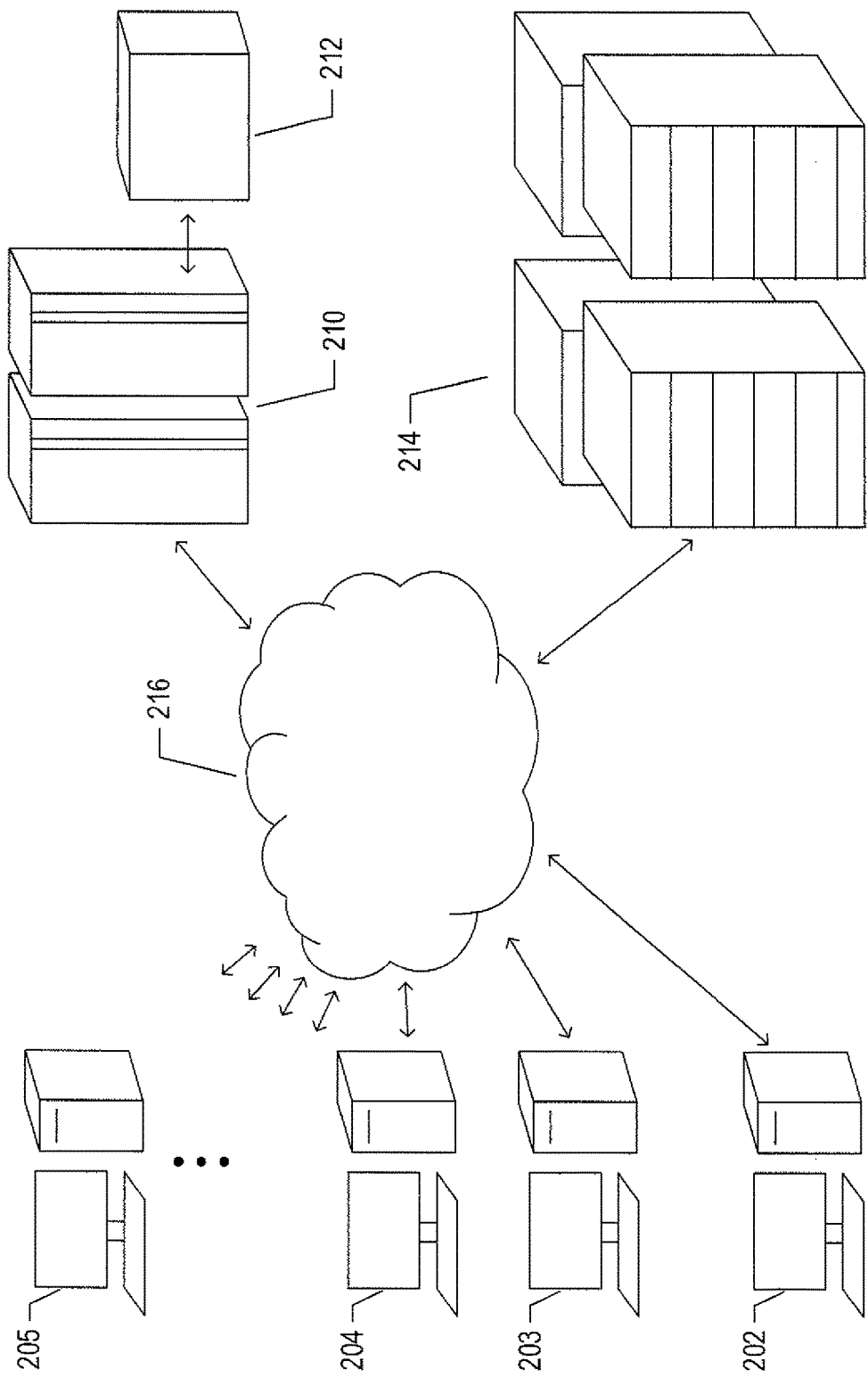
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
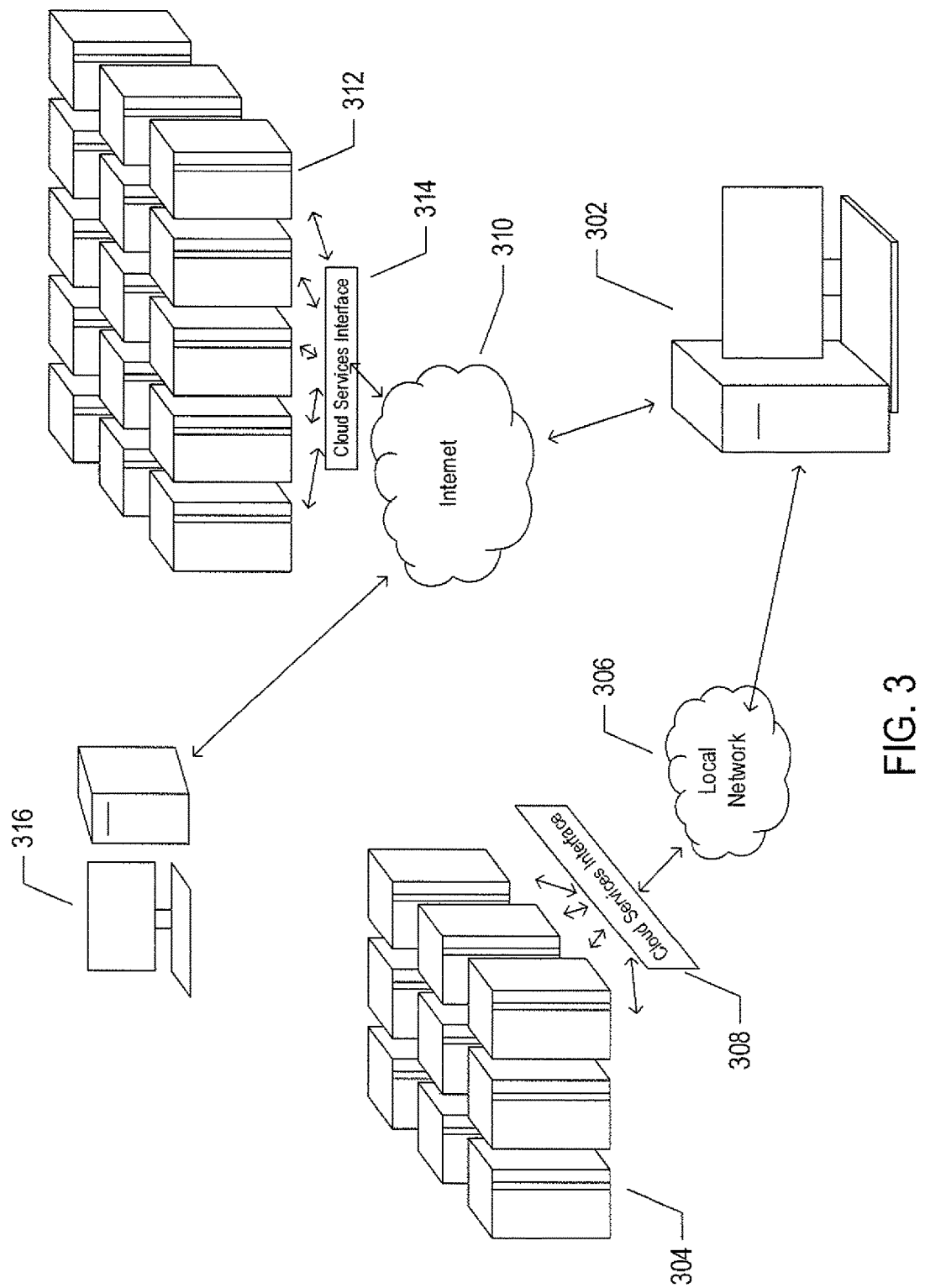
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
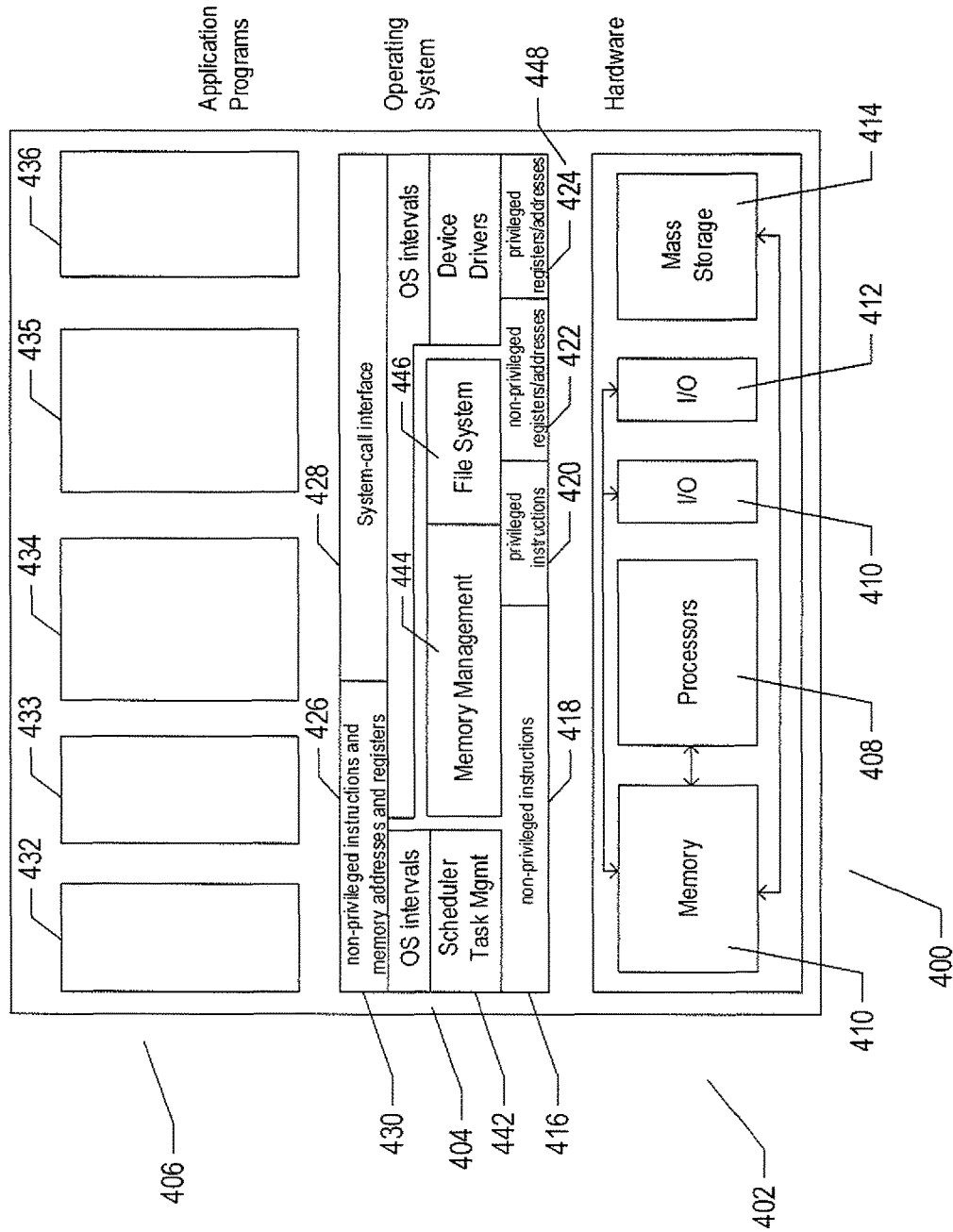
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modem operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
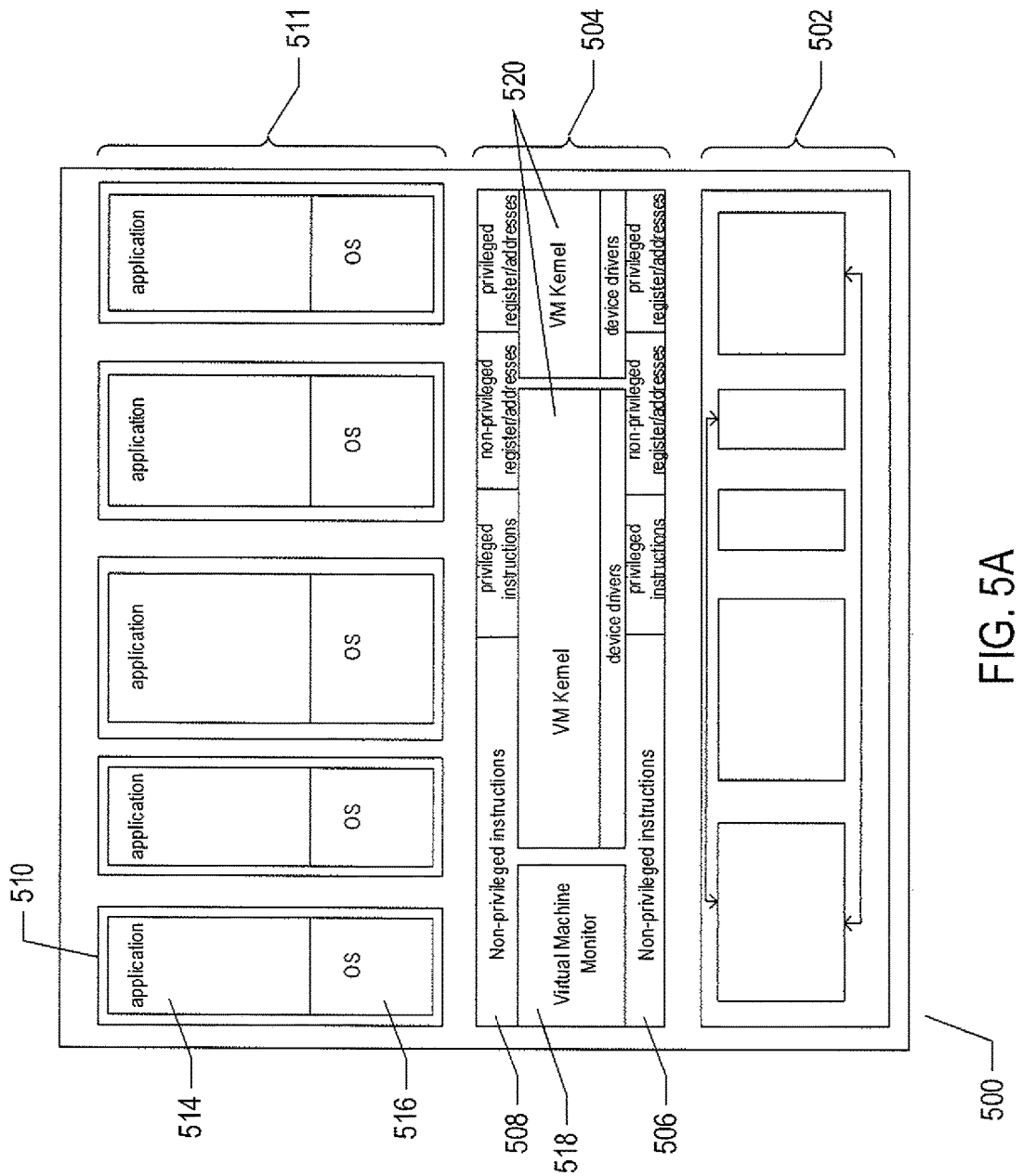
FIGS. 5A-5B show two types of virtual machine and virtual-machine execution environments.
Figure 5B:
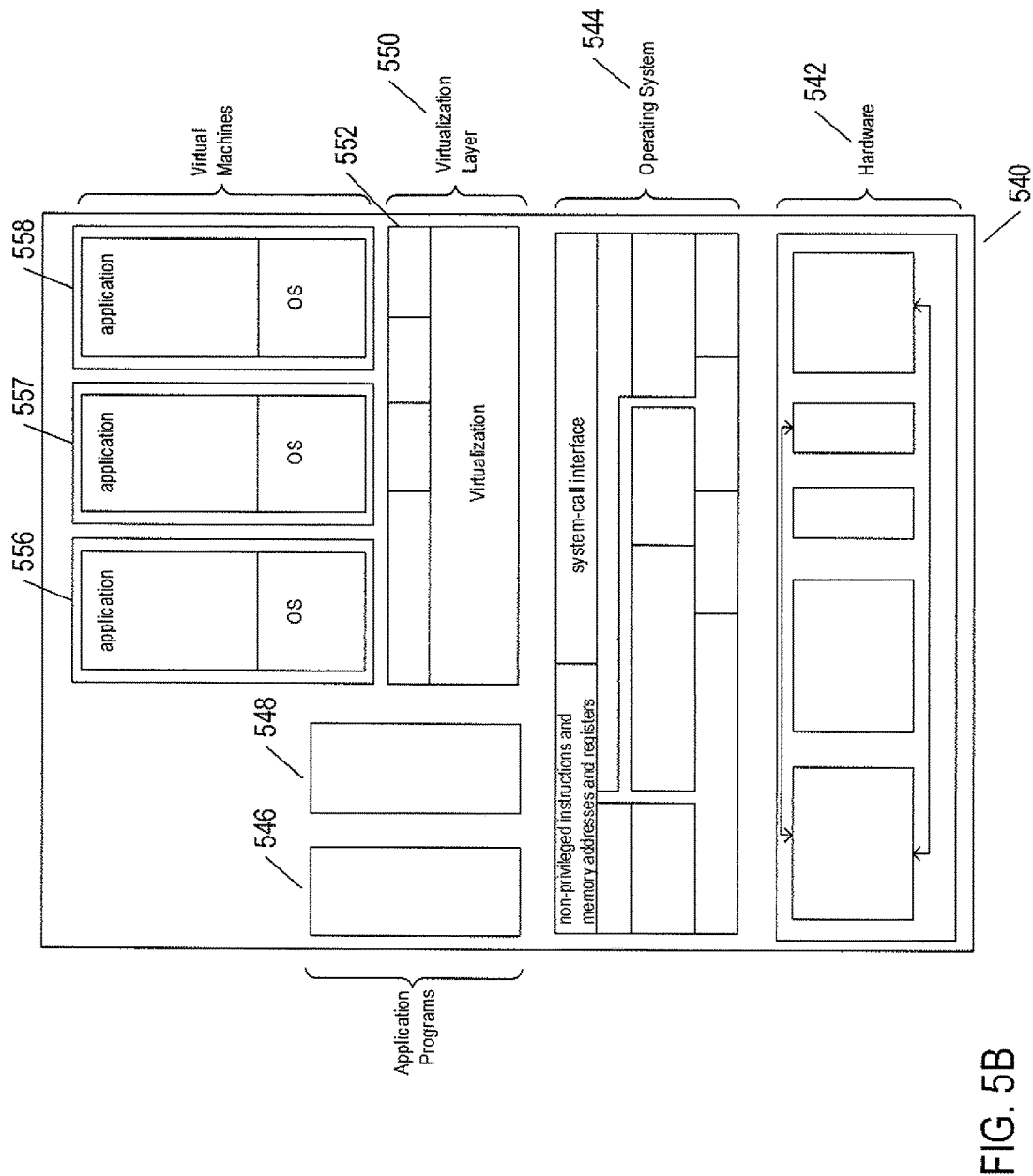

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a virtualization layer 550, similar to hardware-like interface 508 in FIG. 5A. The virtualization layer 550, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
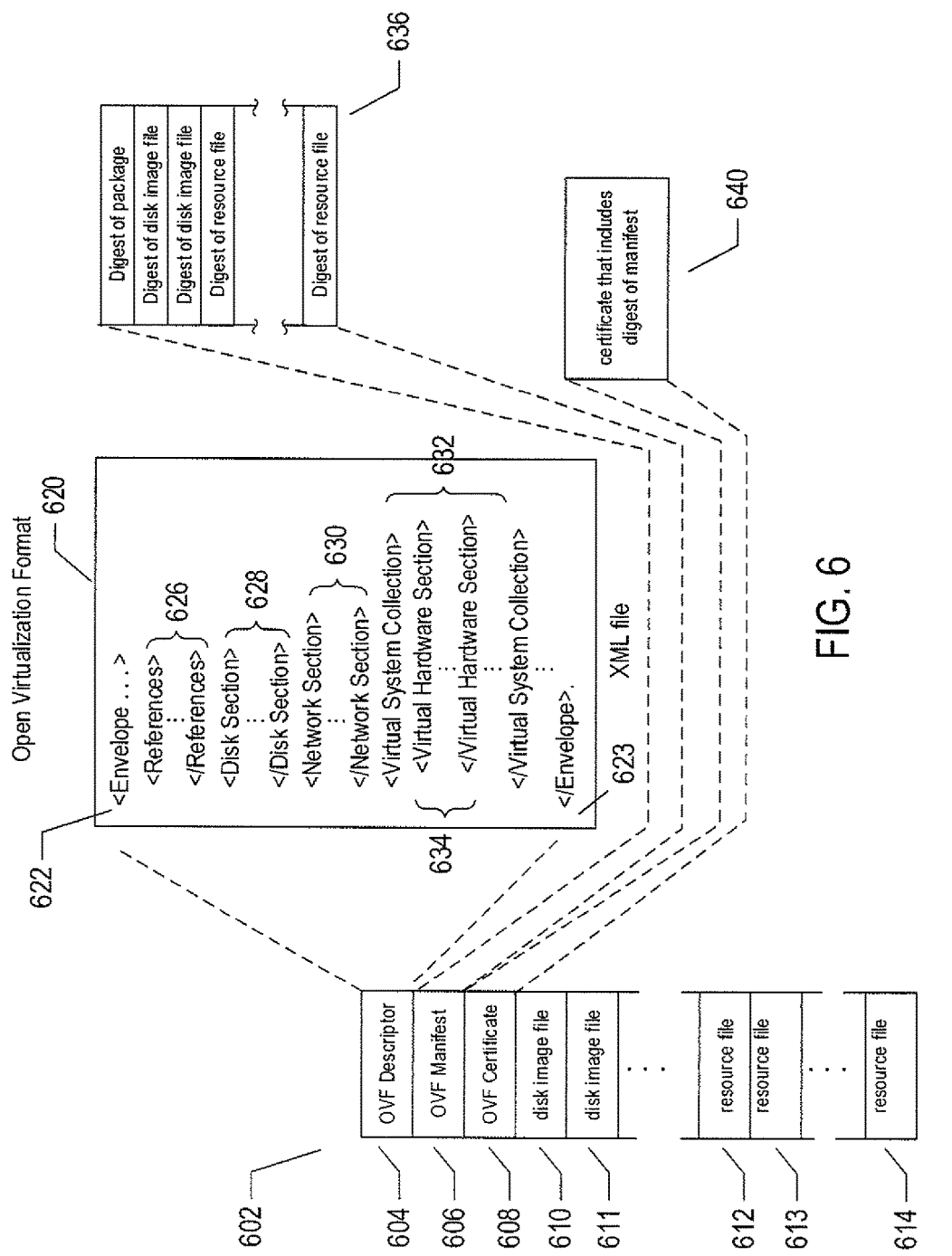
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
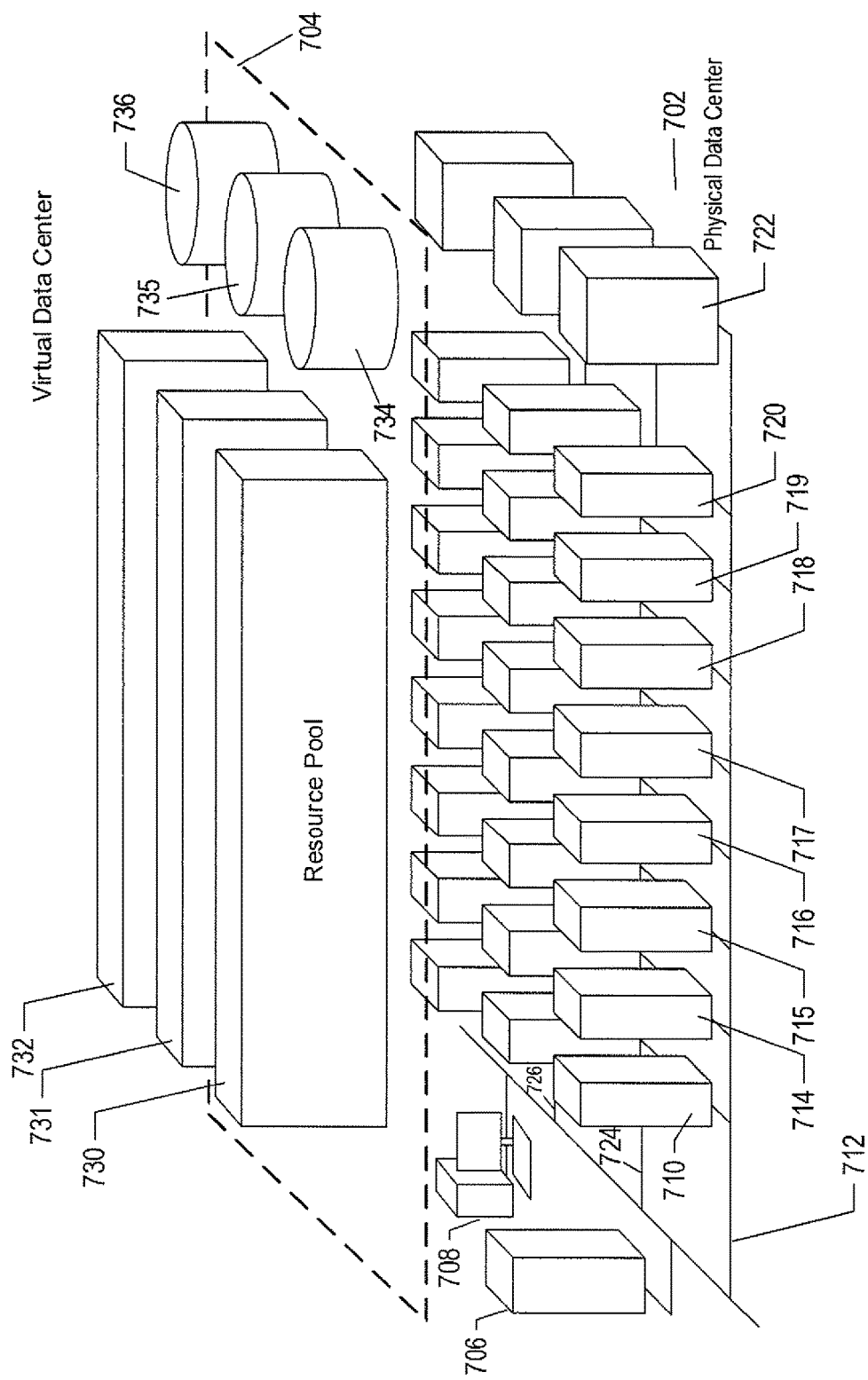
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of physical servers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server 706 includes functionality to migrate running VMs from one physical server to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual physical servers and migrating VMs among physical servers to achieve load balancing, fault tolerance, and high availability.

Figure 8:
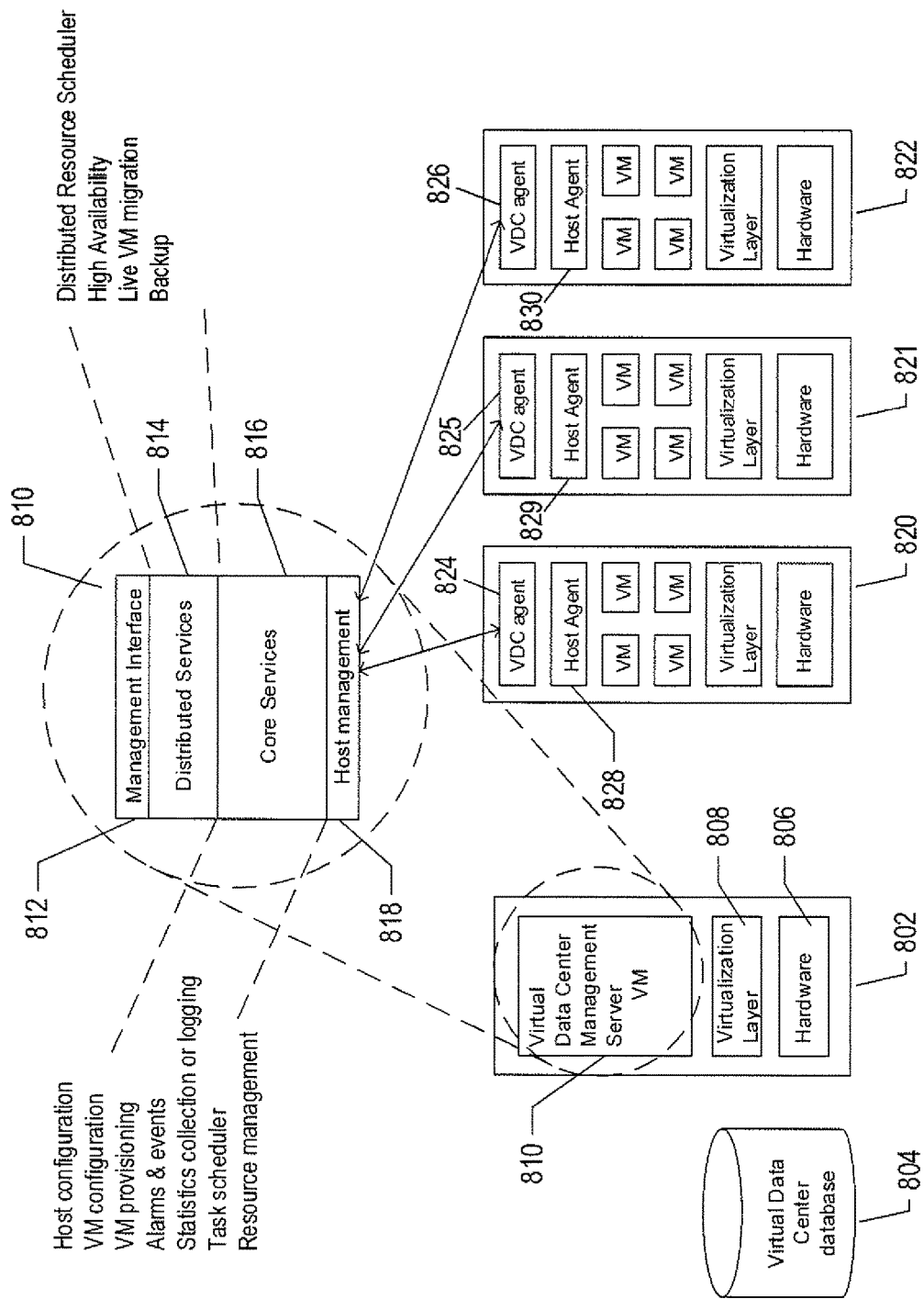
FIG. 8 shows virtual-machine components of a virtual-data-center management server and physical servers of a physical data center.

FIG. 8 shows virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server VM 810 above the virtualization layer. Although shown as a single server in FIG. 8, the virtual-data-center management server ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the physical servers of the physical data center that is abstracted to a virtual data center by the VDC management server.

The distributed services 814 include a distributed-device scheduler that assigns VMs to execute within particular physical servers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server, and restarts the VM on the different physical server from a virtual-machine state recorded when execution of the VM was halted. The distributed services 814 also include a distributed backup service that provides centralized virtual-machine backup and restore.

The core services 816 provided by the virtual-data-center management-server VM 810 include host configuration, virtual-machine configuration, virtual-machine provisioning, generation of virtual-data-center alarms and events, ongoing event logging and statistics collection, a task scheduler, and a device-management module. Each physical server 820-822 also includes a host-agent VM 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce device allocations made by the virtual-data-center management-server VM 810, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
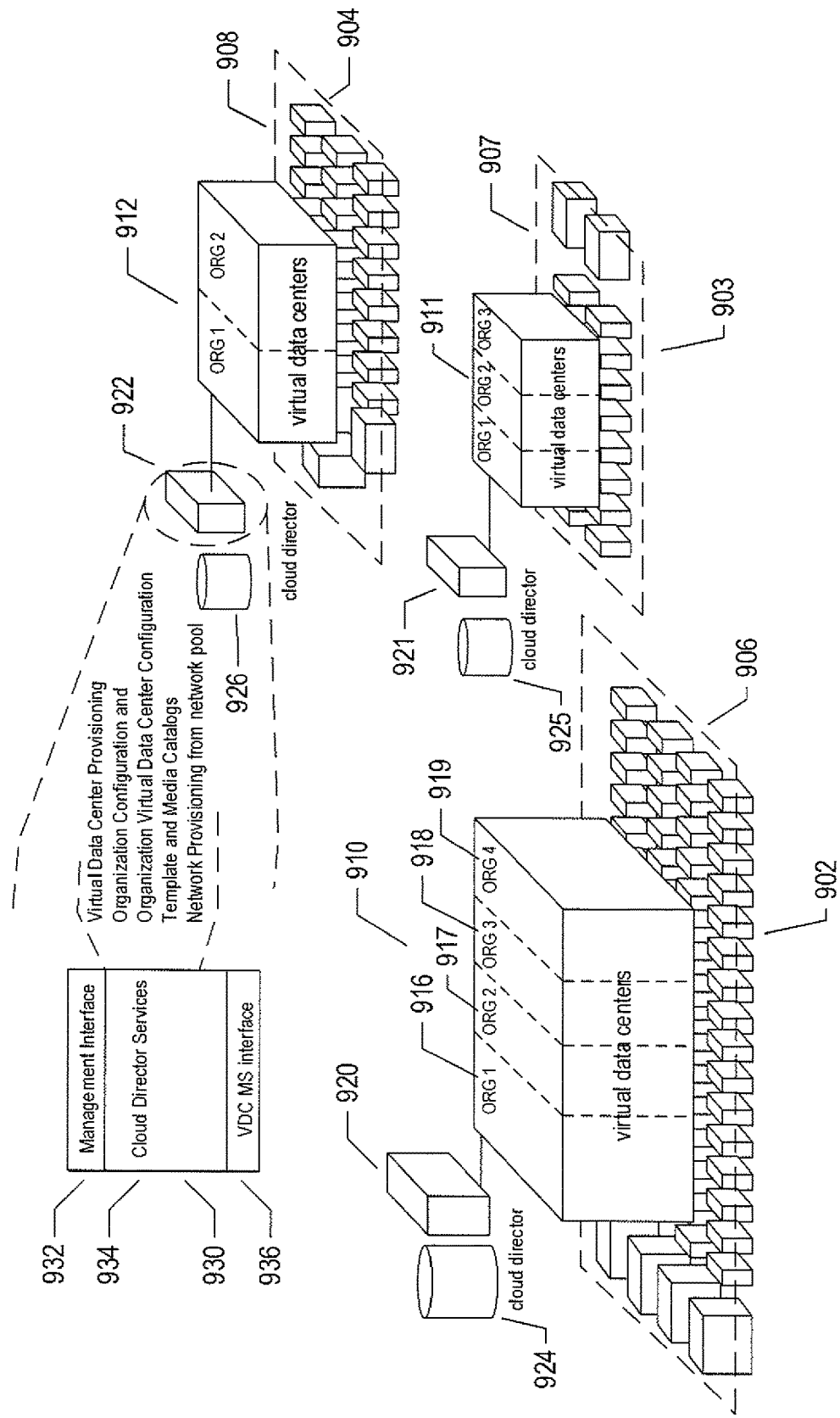
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
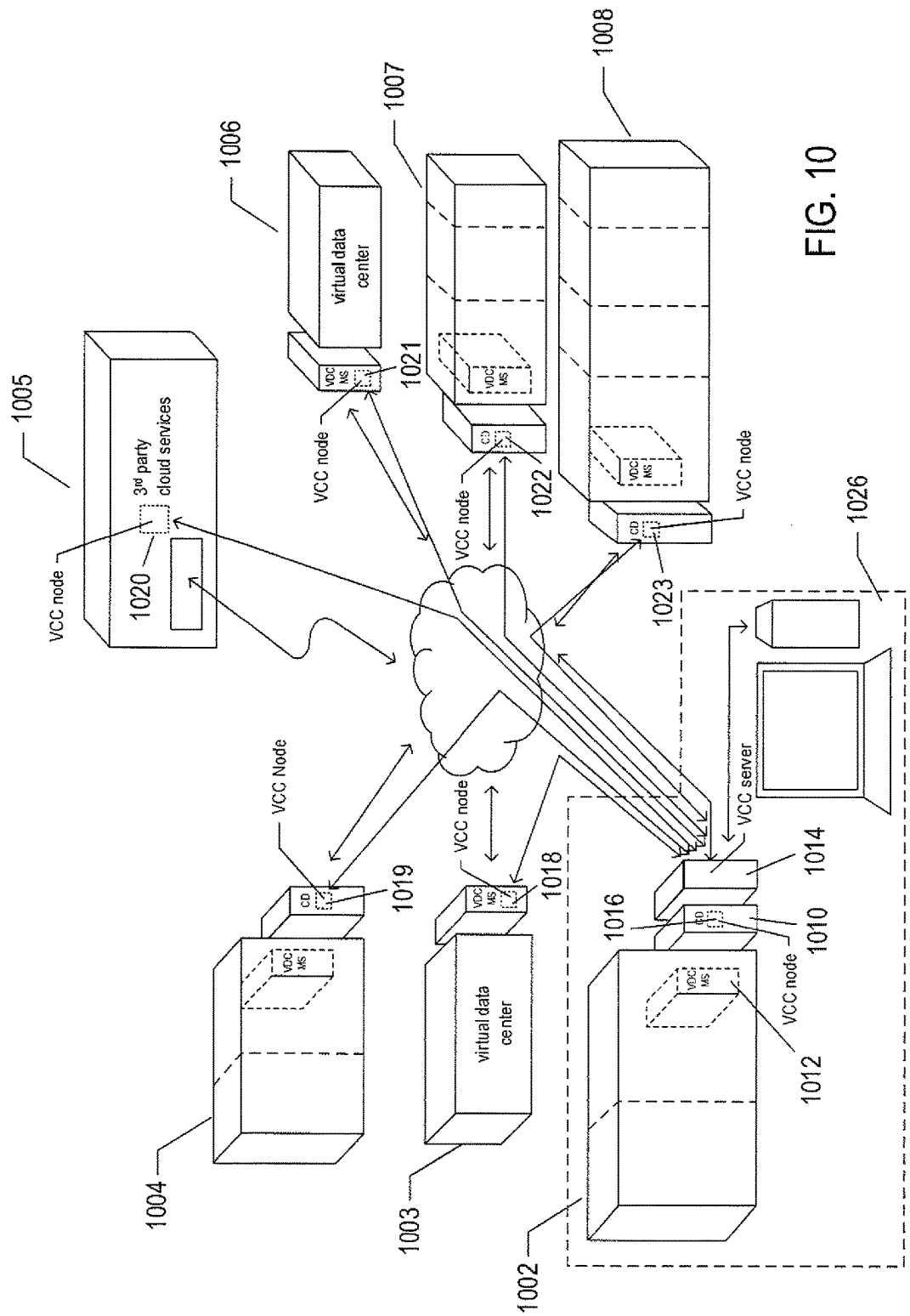
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCCserver-provided aggregate-cloud distributed services. In general, the cloud-computing facilities that together form a multiple-cloud-computing aggregation through distributed services provided by the VCC server and VCC nodes are geographically and operationally distinct.

Methods to Compute an Efficiency Coefficient Associated with a Set of VMs

Methods of computing an efficiency coefficient are now described. The efficiency coefficient is computed as a function of ideal and actual cumulative cost distributions of running a set of VMs in a physical data center. The set of VMs may be a cluster of a larger set of VMs that form a VDC or the set of VMs may comprise a VDC. The efficiency coefficient is a metric used to evaluate how efficiently the set of VMs run in a physical data center. In particular, the efficiency coefficient may be used to evaluate cost effective use of physical data center resources by the set of VMs. The resources include servers, network I/O, storage, and power. When the efficiency coefficient violates a minimum efficiency threshold, the set of VMs may be identified as not efficiently or cost effectively using the resources of a physical data center. Alternatively, a series of efficiency coefficients may be generated over time in order to monitor performance of the set of VMs or monitor over time cost effectiveness of a particular assignment of the VMs to the resources of the physical data center.

Figure 11A:
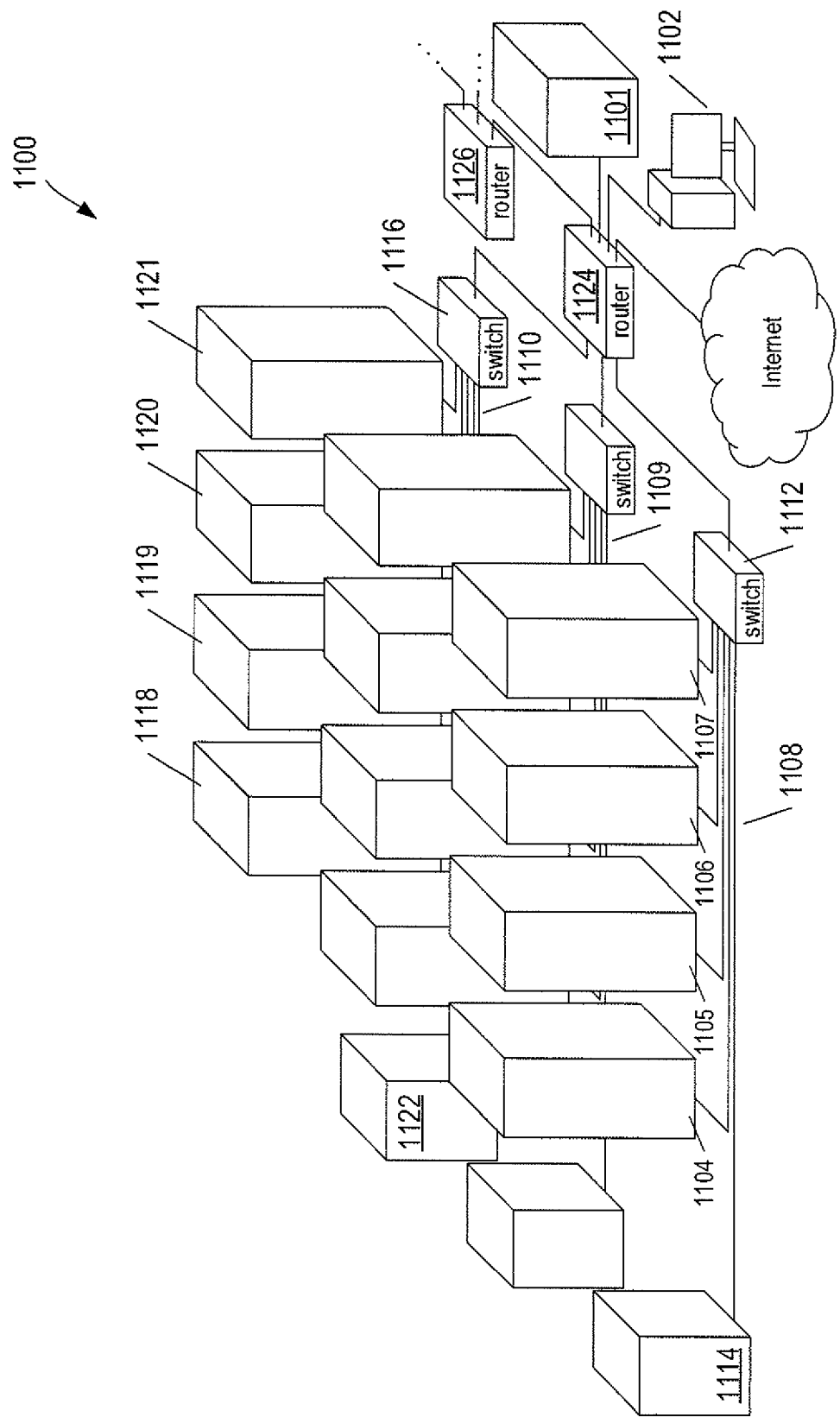
FIG. 11A shows an example of a physical data center.

FIG. 11A shows an example of a physical data center 1100. The physical data center 1100 consists of a virtual-data-center management server 1101 and a PC 1102 on which a virtual-data-center management interface may be displayed to system administrators and other users. The physical data center 1100 additionally includes a number of hosts or server computers, such as server computers 1104-1107, that are interconnected to form three local area networks 1108-1110. For example, local area network 1108 includes a switch 1112 that interconnects the four servers 1104-1107 and a mass-storage array 1114 via Ethernet or optical cables and local area network 1110 includes a switch 1116 that interconnects four servers 1118-1121 and a mass-storage array 1122 via Ethernet or optical cables. In this example, the physical data center 1100 also includes a router 1124 that interconnects the LANs 1108-1110 and interconnects the LANS to the Internet, the virtual-data-center management server 1101, the PC 1102 and to a router 1126 that, in turn, interconnects other LANs composed of server computers and mass-storage arrays (not shown). In other words, the routers 1124 and 1126 are interconnected to form a larger network of server computers. A resource is any physical or virtual component of the physical data center with limited availability. The server computers of the physical data center 1100 form a cluster of host computers for a tenant's VDC.

Figure 11B:
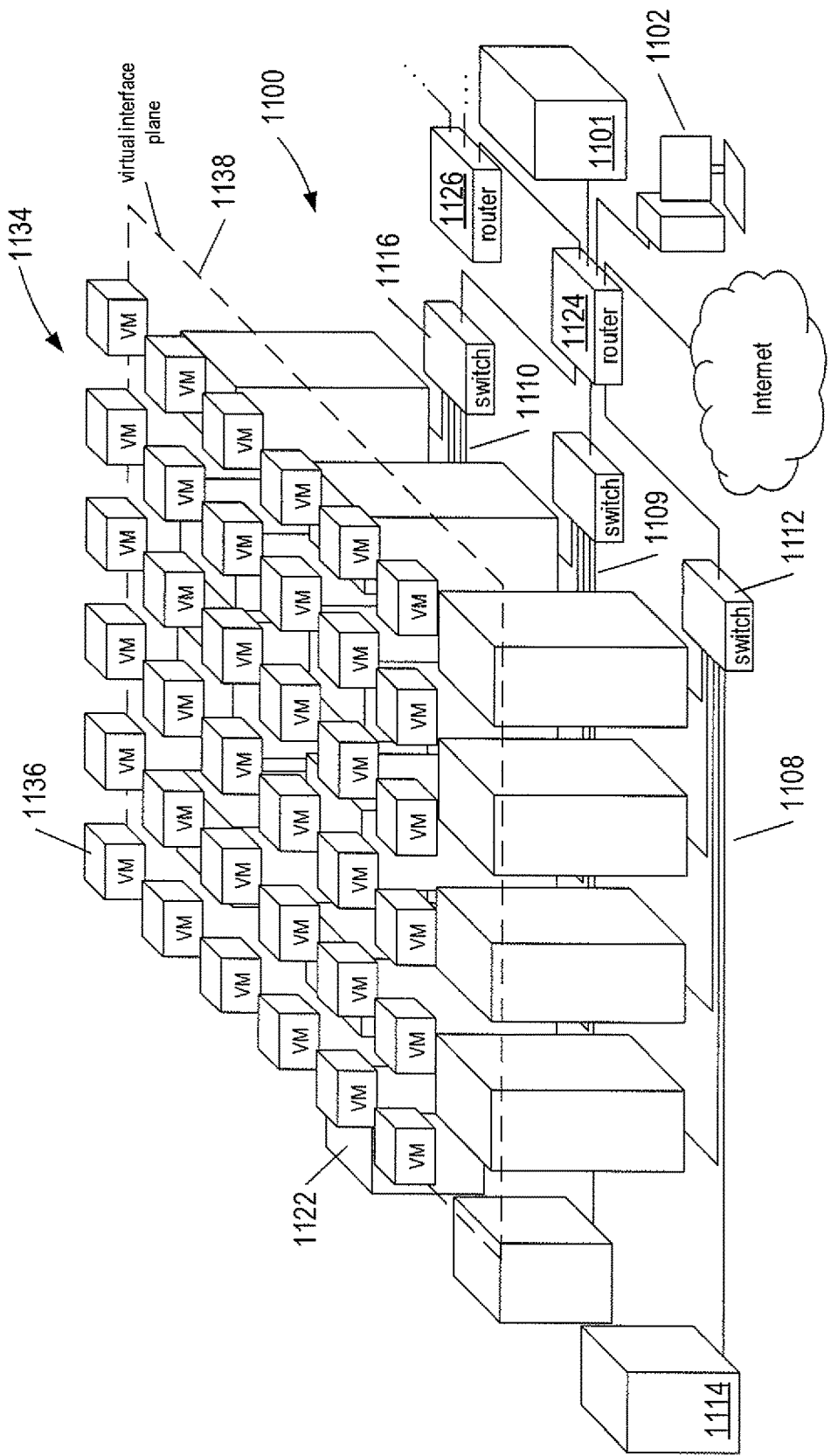
FIG. 11B shows an example set of thirty-six virtual machines above a virtual interface plane of the physical data center shown in FIG. 11A.

FIG. 11B shows an example set of thirty-six VMs 1134, such as VM 1136, above a virtual interface plane 1138. The set of VMs 1134 may be partitioned to run on different servers and because the VMs are not bound physical devices, the VMs may be moved to different servers in an attempt to maximize efficient use of the physical data center 1100 resources. For example, the set of thirty-six VMs 1134 may initially be partitioned so that each server runs three VMs. An efficiency coefficient, computed as described below, may be used to evaluate and monitor the cost effectiveness of the assignment of the thirty-six VMs and/or evaluate and monitor the efficiency with which the set of VMs utilize the resources of the physical data center 1100. Based on the value of the efficiency coefficient or how the efficiency coefficient changes over time, the set of VMs may be re-assigned to different servers.

Methods compute the efficiency coefficient based on a number of cost drivers. The cost drivers include cost of hardware, software, labor, rent, power, cooling, storage, and network devices, just to name a few. For example, hardware cost may include depreciation cost of the servers used to run the set of VMs. The servers may be grouped according to make and model. The current monthly cost of each group may be computed based on depreciation cost of each group. Storage cost may be categorized as either storage profile or storage types and monthly cost may be determined per GB. For example, the monthly cost of using a data-storage device with a total of 463 GB of storage at a monthly cost as $0.1/GB would cost about $46. Storage costs may not be attributed to the fully loaded server cost and may be applied to VMs based on the class of storage and usage. Network cost may be distributed based on the capacity of each server's network interface controller ("NIC") card. Facilities cost may be calculated based on monthly cost of rent per server rack unit and monthly cost for power and cooling per kilowatt-hours. Total Facilities cost may be calculated by multiplying the costs by the respective rack units and kilowatt-hour. For each fully loaded server, cost may be computed by multiplying these rates with rack units occupied by the server and kilowatt ratings of the server respectively.

Figure 12:
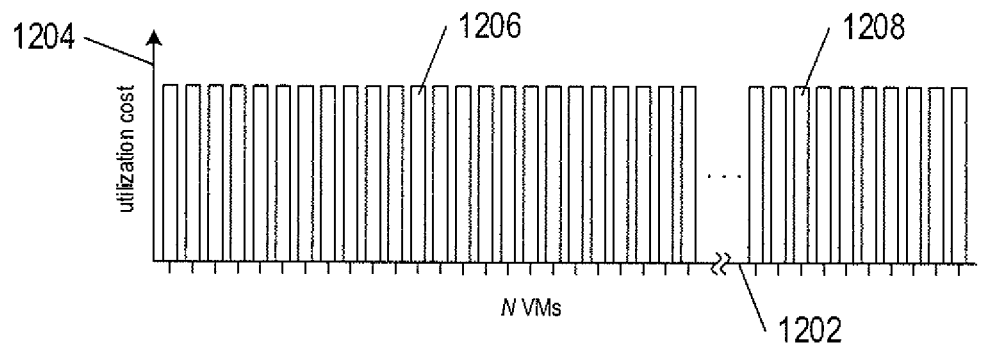
FIG. 12 shows an example distribution of ideal utilization cost of running a set of virtual machines in a physical data center.

FIG. 12 shows an example distribution of ideal utilization cost of running a set of N VMs in a physical data center. Horizontal axis 1202 represents the set of VMs, each mark representing one of the N VMs, and vertical axis 1204 represents resource utilization cost. In this example, each bar represents an ideal utilization cost of running one of the N VMs for a period of time. The period of time may, for example, be an hour, a day, a week, a month, or any suitable duration. In the ideal scenario of FIG. 12, the utilization costs of running each of the N VMs are the same, as represented by the bars having the same length. FIG. 12 represents an ideal utilization cost distribution for the set of VMs. For example, bars 1206 and 1208 represent the same ideal utilization cost of running two VMs in the physical data center for the same period of time.

Figure 13:
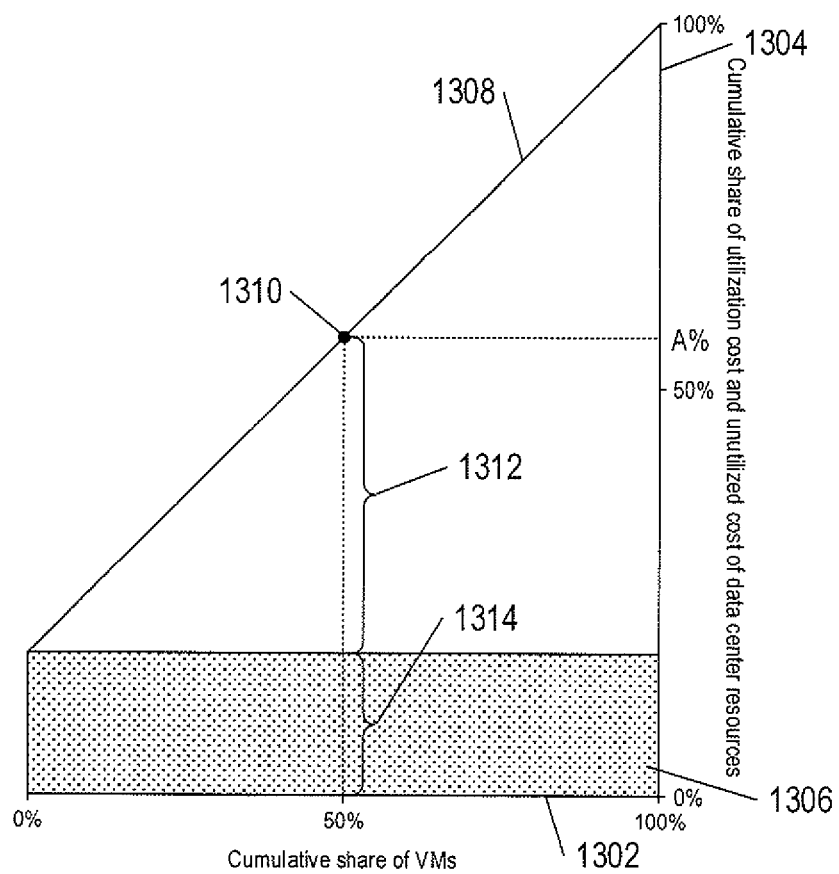
FIG. 13 shows a plot of an example ideal cumulative utilization cost distribution of the set of virtual machines.

FIG. 13 shows a plot of an ideal cumulative utilization cost distribution of the set of N VMs running in the physical data center. Horizontal axis 1302 represents the cumulative share of VMs as a percentage of the set of VMs and vertical axis 1304 represents the cumulative share of utilization cost and unutilized cost of physical data center resources as a percentage. Shaded region 1306 represents unutilized cost of the physical data center resources by the set of VMs. The unutilized cost 1306 represents physical data center costs that are not related to running the set of VMs in the data. As a result, the unutilized cost is substantially constant regardless of the percentage of the set of VMs considered. By assuming that the ideal utilization cost associate with each of the VMs are the same as shown in FIG. 12, the ideal cumulative utilization cost distribution 1308 is defined by a line with a positive slope of one. Line 1308 represents the ideal cumulative utilization cost distribution of the set of N VMs as a percentage of the cumulative share of utilization cost and unutilized cost of the physical data center resources. For example, a point 1310 on the ideal cumulative utilization cost distribution 1308 is a percentage, denoted by A %, of the cumulative share of utilization cost 1312 and unutilized cost 1314 of the physical data center resources used by 50% of the sorted set of VMs.

FIG. 14 shows an example distribution of actual utilization cost of running the set of N VMs in the same physical data center. Horizontal axis 1402 represents the set of N VMs, each mark representing one of the N VMs, and vertical axis 1404 represents resource utilization cost. In this example, each bar represents an actual utilization cost of running one of the N VMs for the period of time. In the actual scenario of FIG. 14, the actual utilization cost of each VM's is different, as represented by uneven bar lengths. For example, bars 1406 and 1408 represent different actual utilization cost of running two different VMs in the physical data center for the same period of time. The actual utilization cost of each VM may be calculated by summing the cost drivers associated with running the VM in the physical data center:

$$V = \sum_{k=1}^{K} C_k \quad (1)$$

where
V is the actual utilization cost of physical data center resources used by an associated VM;
K is the number of cost drivers; and
$C_k$ is the cost of a particular cost driver.

For example, $C_1$ may represent hardware cost (e.g., use of a server) over the period of time, and $C_2$ may represent storage cost over the period of time.

The set of N VMs are sorted from lowest to highest associated actual utilization cost into a sorted set of N VMs represented by an order set $$\{VM_i\}_{i=1}^{N} \quad (2)$$

where
$VM_i$ represents a VM of the sorted set of N VMs with corresponding actual utilization cost $V_i$; and
$V_{i+1} \geq V_i$ for each pair of consecutive $VM_i$ and $VM_{i+1}$ in the sorted set.

FIG. 15 shows a distribution of the actual utilization cost of the sorted set of N VMs. Horizontal axis 1502 represents the set of N VMs sorted from lowest to highest according to associated actual utilization cost shown in FIG. 14, and vertical axis 1504 represents resource utilization cost. For example, the VM with actual utilization cost 1406 in FIG. 14 ranks $4^{th}$ and is denoted by $VM_4$ with actual utilization cost $V_4$ and the VM with higher actual utilization cost 1408 in FIG. 14 ranks $22^{nd}$ and is denoted by $VM_{22}$ with actual utilization cost $V_{22}$.

FIG. 16 shows a plot of an actual cumulative cost distribution of the set of N VMs running in the physical data center. Horizontal axis 1602 represents the cumulative share of VMs as a percentage of the set of VMs sorted from lowest to highest associated actual utilization cost and vertical axis 1604 represents the cumulative share of utilization cost and unutilized cost of physical data center resources as a percentage. Shaded region 1606 represents the same unutilized cost of the physical data center described above with reference to FIG. 13. Curve 1608 represents the actual cumulative cost distribution of the sorted set of N VMs as a percentage of the cumulative share of utilization cost and unutilized cost of the physical data center resources. For example, a point 1610 on the actual cumulative cost distribution 1608 is a percentage B % of the cumulative share of utilization cost 1612 and unutilized cost 1614 of the physical data center resources used by 50% of the sorted set of VMs.

Figure 17:
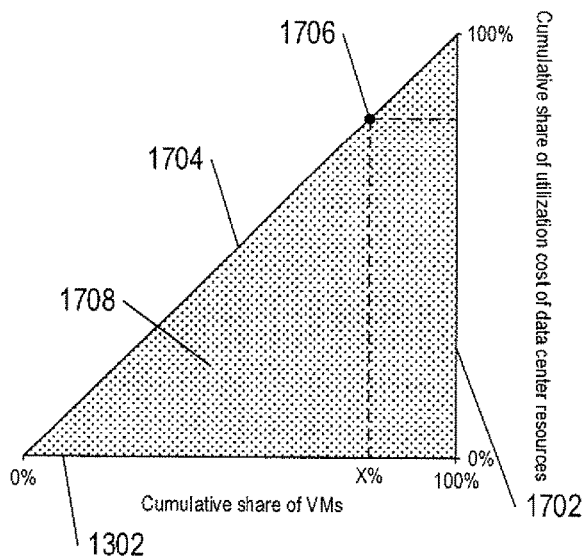
FIG. 17 shows a plot of an example ideal cumulative utilization cost distribution of a set of virtual machines.

Because the unutilized cost of the physical data center resources is substantially constant and unrelated to the utilization costs of the VMs, as shown in FIG. 13, the unutilized cost is subtracted from the ideal cumulative cost distribution 1308 of FIG. 13 to obtain an ideal cumulative utilization cost distribution of the set of N VMs shown in FIG. 17. Vertical axis 1702 represents the cumulative share of utilization cost of physical data center resources as a percentage. Line 1704 represents the ideal cumulative distribution of utilization cost of the set of N VMs shown in FIG. 12 without the unutilized cost. A point along the ideal cumulative distribution of utilization cost 1704, such as point 1706, is a percentage of the ideal utilization cost of X % of the set of N VMs. Shaded area 1708 under the ideal cumulative distribution of utilization cost 1704 is the total ideal cumulative utilization cost distribution of the set of N VMs and is denoted by TICD.

Figure 18:
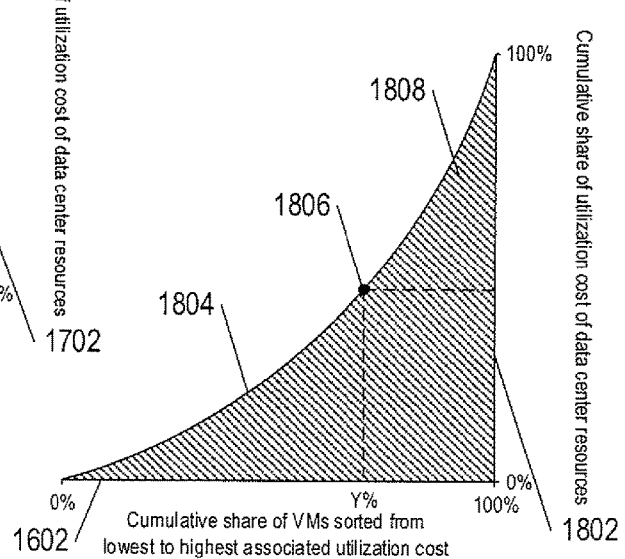
FIG. 18 shows a plot of an example actual cumulative utilization cost distribution of a set of virtual machines.

The unutilized cost of the physical data center resources is subtracted from the actual cumulative cost distribution 1608 of FIG. 16 to obtain an actual cumulative utilization cost distribution shown in FIG. 18. Vertical axis 1802 represents the cumulative share of utilization cost of physical data center resources. Curve 1804 represents the actual cumulative distribution of utilization cost of the set of N VMs shown in FIG. 12 without the utilization cost. A point along the actual cumulative distribution of utilization cost 1804, such as point 1806, is a percentage of the actual utilization cost of Y % of the sorted set of the N VMs. Hash marked area 1808 under the actual cumulative distribution of utilization cost 1804 is the total actual cumulative utilization cost distribution of the set of N sorted VMs and is denoted by TACD.

The efficiency coefficient may be calculated as the difference between the total ideal cumulative utilization cost distribution minus the total actual cumulative utilization cost distribution divided by the total ideal cumulative utilization cost distribution as follows:

$$C_{eff} = \frac{TICD - TACD}{TICD} \quad (3)$$

where $0 \leq C_{eff} \leq 1$.

Figure 19:
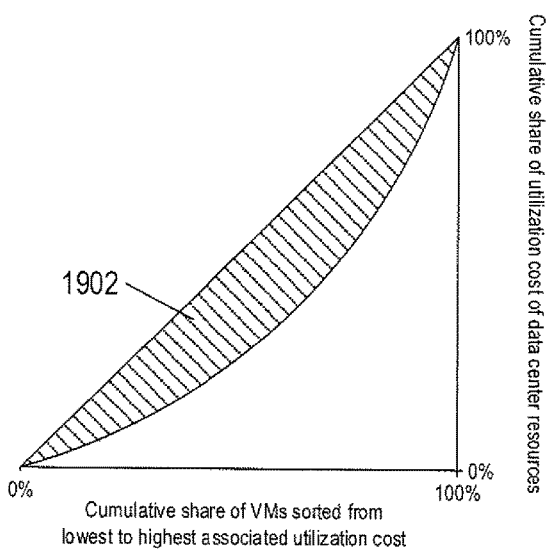
FIG. 19 shows a plot of a portion of a total actual cumulative utilization cost distribution.

FIG. 19 shows a plot of the total actual cumulative utilization cost distribution 1808 of FIG. 18 subtracted from the total ideal cumulative utilization cost distribution 1708. Hash marked area 1902 of FIG. 19 represents portion of the total ideal cumulative utilization cost distribution 1708 remaining after subtracting the total actual cumulative utilization cost distribution 1808. The numerator TICD−TACD represented by shaded region 1902 of FIG. 19 represents a total cumulative cost of underutilized (i.e., wasted) physical data center resources that are available to the set of VMs.

The efficiency coefficient may be used to evaluate the cost effectiveness of the set of VMs or how efficiently the set of VMs utilize the physical data center resources. The closer the efficiency coefficient is to zero (i.e., TACD→TICD), the better the financial performance of the set of VMs and the closer the set of VMs are to maximizing use of the physical data center resources. On the other hand, the closer the efficiency coefficient is to one (i.e., TACD→0), the worse the financial performance of the set of VMs and the farther the set of VMs are away from maximizing use of physical data center resources.

The efficiency coefficient $C_{eff}$ may be used to evaluate the set of VMs utilization of physical data center resources by comparing the efficiency coefficient $C_{eff}$ with a minimum efficiency threshold $T_{eff}$. As a long as $0 \leq C_{eff} \leq T_{eff}$, the financial performance and efficient use of the physical data center resources by set of VMs may be considered satisfactory. On the other hand, when $C_{eff} > T_{eff}$, the financial performance and efficient use of the physical data center resources by the set of VMs may be considered unsatisfactory and an alert may be generated so that individual VMs may be evaluated and the VMs redistributed across the servers. For example, high performance servers may be assigned to more computationally demanding VMs.

The efficiency coefficient may be used to evaluate the set of VMs utilization of physical data center resources by comparing a current calculated efficiency coefficient, denoted by $C_{eff}^{(c)}$, with a previous calculated efficiency coefficient, denoted by $C_{eff}^{(p)}$. For example, $C_{eff}^{(c)} > C_{eff}^{(p)}$ may be an indication that utilization of the physical data center resources by the set of VMs should be adjusted. Otherwise, as long as $C_{eff}^{(c)} < C_{eff}^{(p)}$ distribution of the set of VMs across the servers of the physical data center would not be altered.

A pattern of increasing efficiency coefficients may be used as an indication that utilization of the physical data center resources by the set of VMs should be adjusted. For example, consider a series of efficiency coefficients $C_{eff}^{(1)}$, $C_{eff}^{(2)}$, ..., $C_{eff}^{(n)}$, where $C_{eff}^{(1)}$ represents the oldest computed efficiency coefficient in the series and $C_{eff}^{(n)}$ represents the most recently computed efficiency coefficient in the series. Then if a pattern emerges where efficiency coefficients are consistently increasing, $C_{eff}^{(1)} < C_{eff}^{(2)} < \ldots < C_{eff}^{(n)}$, an alert may be generated and utilization of the physical data center resources by the set of VMs should be adjusted.

An efficiency coefficient for a set of N VMs running in a physical data center may be calculated as follows. FIG. 20A shows a generalized plot of an ideal cumulative distribution of utilization cost associated with the set of N VMs. Horizontal axis 2001 represents a cumulative share of VMs that ranges from 0 to a chart width W. The chart width W may represent the number of VMs in the set of VMs. For example, the chart width W may be 1000, 10000, or more. If the cumulative share of VMs is represented as a percentage then the chart width W is 100%. If the cumulative share of VMs is a fraction then the chart width W is 1. Vertical axis 2002 represents the cumulative share of utilization cost of physical data center resources ranging from 0 to TV. The quantity TV represents a total actual utilization cost of the N VMs computed as follows:

$$TV = \sum_{i=1}^{N} V_i \qquad (4)$$

Line 2003 represents an ideal cumulative distribution of utilization cost of the set of N VMs. The total ideal cumulative utilization cost distribution of the set of N VMs represented by the area 2004 is given by $$TICD = \frac{TV \times W}{2} \qquad (5)$$

FIG. 20B shows a generalized plot of an example actual cumulative distribution of utilization cost of the sorted set of N VMs represented by Equation (1). Horizontal axis 2005 represents a cumulative share of VMs sorted from lowest to highest associated utilization cost that ranges from 0 to the chart width W. Vertical axis 2006 represents the cumulative share of utilization cost of physical data center resources ranging from 0 to TV. Points, such as point 2007, represent a cumulative sum of actual utilization cost calculated according to:

$$TV_i = \sum_{j=1}^{i} V_j \qquad (6)$$

In other words, a point associated with VM $VM_i$ represents the sum of utilization costs of VMs with utilization cost less than and including the actual utilization cost $V_i$. Dashed curve 2008 passing through each of the points represents the actual cumulative distribution of utilization cost associated with the sorted set of N VMs. An approximate total actual cumulative utilization cost distribution of the sorted set of N VMs is computed by numerically integrating over the cumulative sums of the actual utilization cost as follows:

$$\widetilde{TACD} = \sum_{i=1}^{N} (TV_i - TV_{i-1})\frac{W}{2N} = \frac{W}{2N}\sum_{i=1}^{N}(TV_i - TV_{i-1}) \qquad (7)$$

where $TV_N = TV$; and $TV_0$.

The approximate total actual cumulative utilization cost distribution of Equation (7) is an approximate area under the curve 2008. The summand of Equation (7), $$(TV_i - TV_{i-1})\frac{W}{2N},$$

represents an area defined by two adjacent points, such as shaded area 2009, that are summed to compute the approximate total actual cumulative utilization cost distribution.

Given the total ideal cumulative utilization cost distribution of Equation (5) and the approximate total actual cumulative utilization cost distribution of Equation (7), an efficiency coefficient is computed as follows:

$$\tilde{C}_{eff} = \frac{TICD - \widetilde{TACD}}{TICD} \qquad (8)$$

Figure 21:
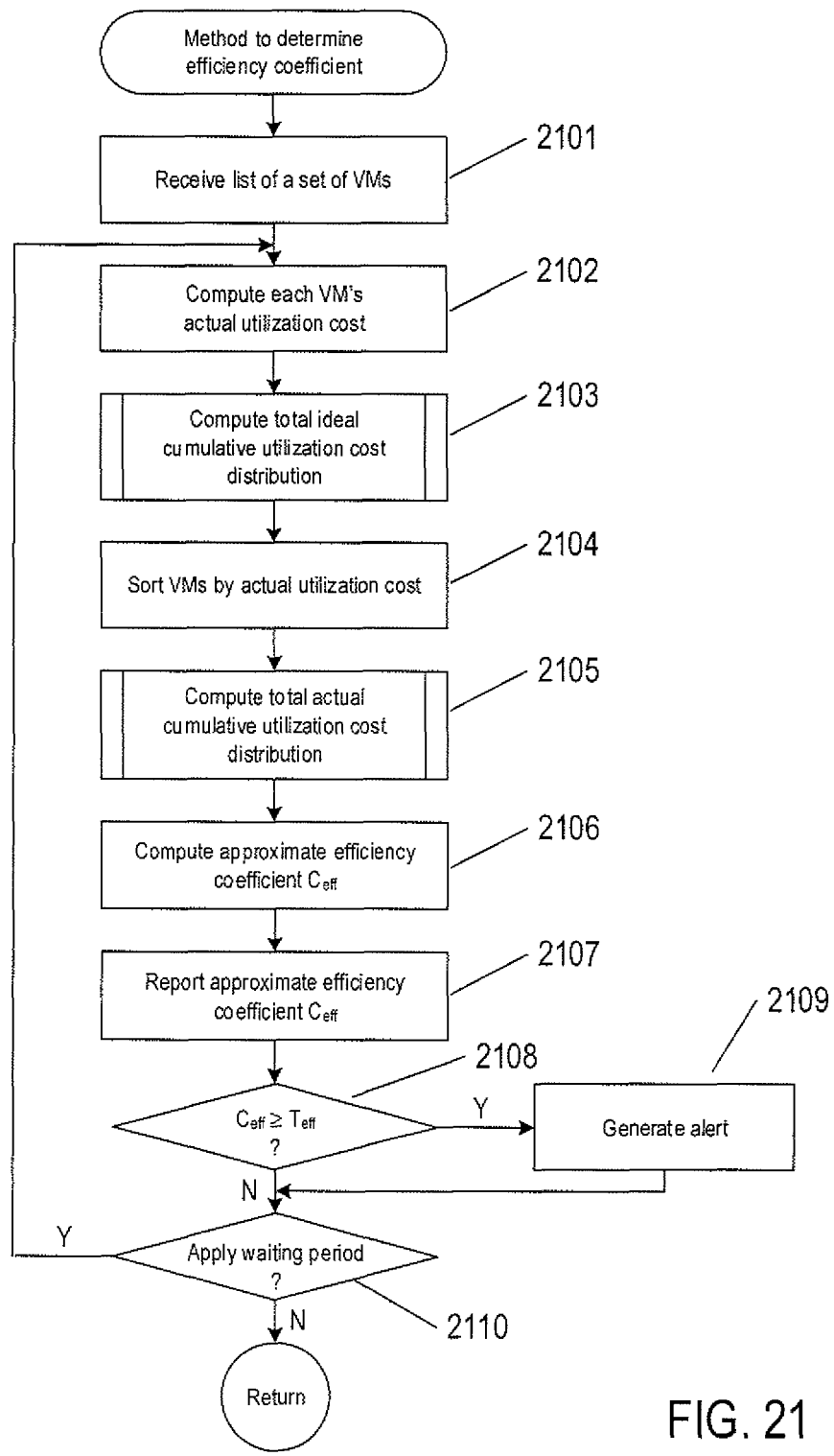
FIG. 21 shows a control-flow diagram of a method to determine an efficiency coefficient for a set of virtual machines.

FIG. 21 shows a control-flow diagram of a method to determine an efficiency coefficient for a set of VMs running in a physical data center. In block 2101, a set of VMs is received to determine an efficiency coefficient. The set of VMs may be a collection of VMs that form a VDC or the set of VMs may be a subset of a larger set of VMs that comprises a VDC. In block 2102, an actual utilization cost of using data resources is determined for each of the VMs is the set. The actual utilization cost associated with each VM may be computed as a sum of the cost drivers associated with the VM, as described above with reference to Equation (1). In block 2103, a routine "compute total ideal cumulative utilization cost distribution" of the set of VMs is called. In block 2104, the VMs are sorted according to their associated actual utilization cost from lowest to highest actual utilization costs, as described above with reference to Equation (2)

and FIGS. 14 and 15. In block 2105, a routine "compute total actual cumulative utilization cost distribution" is called to compute the total actual cumulative cost distribution for the set of VMs. In block 2106, an approximate efficiency coefficient is computed as described above with reference to Equation (8) based on the total ideal cumulative cost distribution computed in block 2102 and the total actual cumulative cost distribution computed in block 2105. In block 2107, the approximate efficiency coefficient is stored in a data-storage device and is displayed on a virtual-data-center management interface. In decision block 2108, when the efficiency coefficient is greater than a minimum efficiency threshold, control flows to block 2109. Otherwise, control flows to decision block 2110. In block 2109, an alert is generated indicating that the sets of VMs utilization of the physical data center resources is not cost effective or not efficient. In block 2110, when a waiting period has elapsed, the computational operations of blocks 2102-2109 may be repeated in order to determine if the efficiency coefficient has changed.

Figure 22:
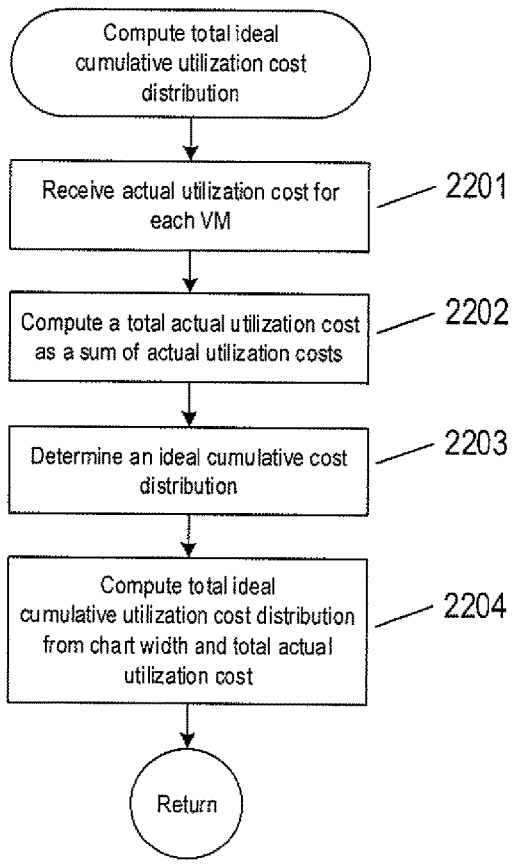
FIG. 22 shows a control-flow diagram of the routine "compute total ideal cumulative utilization cost distribution" called in FIG. 22.

FIG. 22 shows a control-flow diagram of the routine "compute total ideal cumulative utilization cost distribution" called in block 2102 of FIG. 22. In block 2201, the actual utilization costs computed for each of the VMs in block 2102 of FIG. 22 are received. In block 2202, a total actual utilization cost is computed as a sum of the actual utilization cost described above with reference to Equation (4). In block 2203, an ideal cumulative cost distribution is determined as described above with reference FIG. 20A. In block 2204, the total ideal cumulative utilization cost distribution may be computed from a chart with width of the set of VMs and the total actual utilization cost as described above with reference to Equation (5).

Figure 23:
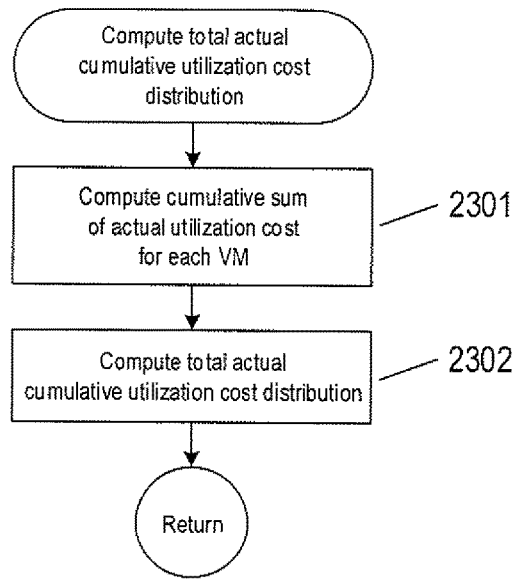
FIG. 23 shows a control-flow diagram of the routine "compute total actual cumulative utilization cost distribution" called in FIG. 22.

FIG. 23 shows a control-flow diagram of the routine "compute total actual cumulative utilization cost distribution" called in block 2105 of FIG. 22. In block 2301, a cumulative sum of actual utilization cost is computed for each VM as described above with reference to Equation (6). In block 2302, a total actual cumulative cost utilization distribution may be computed from the cumulative sums of the actual utilization cost as described above with reference to Equation (7).

It is appreciated that the various implementations described herein are intended to enable any person skilled in the art to make or use the present disclosure. Various modifications to these implementations will be readily apparent to those skilled in the art, and the generic principles defined herein may be applied to other implementations without departing from the spirit or scope of the disclosure. For example, any of a variety of different implementations can be obtained by varying any of many different design and development parameters, including programming language, underlying operating system, modular organization, control structures, data structures, and other such design and development parameters. Thus, the present disclosure is not intended to be limited to the implementations described herein but is to be accorded the widest scope consistent with the principles and novel features disclosed herein.

The invention claimed is:

1. A method stored in one or more data-storage devices and executed using one or more processors of a computing environment to compute an efficiency coefficient of a set of virtual machines ("VMs") that run in a physical data center, the method comprising:
computing an actual utilization cost of resources of the physical data center, for each VM;
computing a total ideal cumulative utilization cost distribution of the set of VMs based on a total actual utilization cost of the VMs;
sorting the set of VMs to generate a sorted set of VMs based on the actual utilization cost associated with each VM, the sorted set of VMs arranged from lowest to highest associated actual utilization cost;
computing an approximate total actual cumulative utilization cost distribution of the sorted set of VMs based on the actual utilization cost associated with each VM;
computing an efficiency coefficient as a function of the total ideal cumulative utilization cost distribution and the approximate total actual cumulative utilization cost distribution; and
re-assigning the set of VMs to one or more server computers of the data center when the efficiency coefficient violates a minimum efficiency threshold.

2. The method of claim 1, wherein computing an actual utilization cost of resources of the physical data center for each VM further comprises summing cost drivers associated with each VM.

3. The method of claim 1, wherein computing the total ideal cumulative utilization cost distribution of the set of VMs further comprises:
receiving the actual utilization cost of the resources for each VM;
summing the actual utilization cost of the resource to generate the total actual utilization cost;
determining an ideal cumulative distribution of utilization cost based on a chart width and the total actual utilization cost; and
computing the total ideal cumulative utilization cost distribution as an area between the ideal cumulative distribution of utilization cost and a chart width.

4. The method of claim 1, wherein computing the approximate total actual cumulative utilization cost distribution of the sorted set of VMs further comprises:
computing a cumulative sum of the actual utilization cost for each VM; and
computing the total actual cumulative utilization cost distribution based on the cumulative sum of actual utilization cost for each VM.

5. The method of claim 4, computing the cumulative sum of the actual utilization cost for each VM further comprises for each VM of the set of sorted VMs, computing a sum of actual utilization costs of VMs with utilization cost less than and including the actual utilization cost associated with the VM.

6. The method of claim 4, wherein computing the approximate total actual cumulative utilization cost distribution based on the cumulative sum of actual utilization cost further comprises numerically integrating over of the cumulative sums of the actual utilization costs.

7. The method of claim 1, wherein computing the efficiency coefficient further comprises:
computing a difference between the total ideal cumulative utilization cost distribution and the approximate total actual cumulative utilization cost distribution; and
dividing the difference by the total ideal cumulative utilization cost distribution to generate the efficiency coefficient.

8. The method of claim 1, wherein the efficiency coefficient violates a minimum efficiency threshold further comprises the efficiency coefficient is greater than the minimum efficiency threshold.

9. A system comprising:
one or more processors;

one or more data-storage devices; and machine-readable instructions stored in the data-storage devices and executed using the one or more processors, the machine-readable instructions computing an actual utilization cost of resources of the physical data center, for each virtual machine ("VM");

computing a total ideal cumulative utilization cost distribution of the set of VMs based on a total actual utilization cost of the VMs;

sorting the set of VMs to generate a sorted set of VMs based on the actual utilization cost associated with each VM, the sorted set of VMs arranged from lowest to highest associated actual utilization cost;

computing an approximate total actual cumulative utilization cost distribution of the sorted set of VMs based on the actual utilization cost associated with each VM;

computing an efficiency coefficient as a function of the total ideal cumulative utilization cost distribution and the total actual cumulative utilization cost distribution; and re-assigning the set of VMs to one or more server computers of the data center when the efficiency coefficient violates a minimum efficiency threshold.

10. The system of claim 9, wherein computing an actual utilization cost of resources of the physical data center for each VM further comprises summing cost drivers associated with each VM.

11. The system of claim 9, wherein computing the total ideal cumulative utilization cost distribution of the set of VMs further comprises:

receiving the actual utilization cost of the resources;

summing the actual utilization cost of the resource to generate the total actual utilization cost;

determining an ideal cumulative distribution of utilization cost based on a chart width and the total actual utilization cost; and computing the total ideal cumulative utilization cost distribution as an area between the ideal cumulative distribution of utilization cost and a chart width.

12. The system of claim 9, wherein computing the approximate total actual cumulative utilization cost distribution of the sorted set of VMs further comprises:

computing a cumulative sum of the actual utilization cost for each VM; and computing the total actual cumulative utilization cost distribution based on the cumulative sum of actual utilization cost for each VM.

13. The system of claim 12, computing the cumulative sum of the actual utilization cost for each VM further comprises for each VM of the set of sorted VMs, computing a sum of actual utilization costs of VMs with utilization cost less than and including the actual utilization cost associated with the VM.

14. The system of claim 12, wherein computing the approximate total actual cumulative utilization cost distribution based on the cumulative sum of actual utilization cost further comprises numerically integrating over of the cumulative sums of the actual utilization costs.

15. The system of claim 9, wherein computing the efficiency coefficient further comprises:

computing a difference between the total ideal cumulative utilization cost distribution and the approximate total actual cumulative utilization cost distribution; and dividing the difference by the total ideal cumulative utilization cost distribution to generate the efficiency coefficient.

16. The system of claim 9, wherein the efficiency coefficient violates a minimum efficiency threshold further comprises the efficiency coefficient is greater than the minimum efficiency threshold.

17. A non-transitory computer-readable medium encoded with machine-readable instructions that implement a method carried out by one or more processors of a computer system to perform the operations of computing an actual utilization cost of resources of the physical data center for each virtual machine ("VM");

computing a total ideal cumulative utilization cost distribution of the set of VMs based on a total actual utilization cost of the VMs;

sorting the set of VMs to generate a sorted set of VMs based on the actual utilization cost associated with each VM, the sorted set of VMs arranged from lowest to highest associated actual utilization cost;

computing an approximate total actual cumulative utilization cost distribution of the sorted set of VMs based on the actual utilization cost associated with each VM;

computing an efficiency coefficient as a function of the total ideal cumulative utilization cost distribution and the total actual cumulative utilization cost distribution; and re-assigning the set of VMs to one or more server computers of the data center when the efficiency coefficient violates a minimum efficiency threshold.

18. The medium of claim 17, wherein computing an actual utilization cost of resources of the physical data center for each VM further comprises summing cost drivers associated with each VM.

19. The medium of claim 17, wherein computing the total ideal cumulative utilization cost distribution of the set of VMs further comprises:

receiving the actual utilization cost of the resources;

summing the actual utilization cost of the resource to generate the total actual utilization cost;

determining an ideal cumulative distribution of utilization cost based on a chart width and the total actual utilization cost; and computing the total ideal cumulative utilization cost distribution as an area between the ideal cumulative distribution of utilization cost and a chart width.

20. The medium of claim 17, wherein computing the approximate total actual cumulative utilization cost distribution of the sorted set of VMs further comprises:

computing a cumulative sum of the actual utilization cost for each VM; and computing the total actual cumulative utilization cost distribution based on the cumulative sum of actual utilization cost for each VM.

21. The medium of claim 20, computing the cumulative sum of the actual utilization cost for each VM further comprises for each VM of the set of sorted VMs, computing a sum of actual utilization costs of VMs with utilization cost less than and including the actual utilization cost associated with the VM.

22. The medium of claim 20, wherein computing the approximate total actual cumulative utilization cost distribution based on the cumulative sum of actual utilization cost further comprises numerically integrating over of the cumulative sums of the actual utilization costs.

23. The medium of claim 17, wherein computing the efficiency coefficient further comprises:

computing a difference between the total ideal cumulative utilization cost distribution and the approximate total actual cumulative utilization cost distribution; and dividing the difference by the total ideal cumulative utilization cost distribution to generate the efficiency coefficient.

24. The medium of claim 17, wherein the efficiency coefficient violates a minimum efficiency threshold further comprises the efficiency coefficient is greater than the minimum efficiency threshold.

* * * * *